United States Patent
Chen

[11] Patent Number: 5,359,869
[45] Date of Patent: Nov. 1, 1994

[54] CONFIGURATION OF AUTOMOBILE STEERING WHEEL LOCKING DEVICES

[76] Inventor: Tian-Yuan Chen, No. 95-4, Ming-Hsiang Street, Chung-Ho, Taipei Hsien,

[21] Appl. No.: 106,846

[22] Filed: Aug. 16, 1993

[51] Int. Cl.⁵ ............................................. B60R 25/02
[52] U.S. Cl. .......................................... 70/209; 70/226
[58] Field of Search ................. 70/209, 211, 212, 225, 70/226, 237, 238

[56] References Cited

U.S. PATENT DOCUMENTS

| | | | |
|---|---|---|---|
| 1,429,334 | 9/1922 | Furber | 70/209 |
| 4,829,797 | 5/1989 | Wu | 70/209 |
| 5,115,652 | 5/1992 | Starmer | 70/209 |

FOREIGN PATENT DOCUMENTS 333461 2/1921 Germany ............................... 70/226

*Primary Examiner*—Lloyd A. Gall

[57] ABSTRACT

An improvement in the configuration of automobile steering wheel locking devices. The automobile steering wheel locking device pertaining to the present invention principally consists of components, which include a main body, stopping bar, lock, casing, hook, spring and holding shaft. A cross bar at the rear of the lock's turning piece rests on a groove at the front of the casing. Turning of the lock's turning piece causes the cross bar to push back the casing and compresses the spring, thereby releasing the hook quickly and allowing the locking device to be removed from the steering wheel. The locking device can be locked on quickly around the steering wheel by pushing the hook upward, thereby causing a grip slot on the inner side of the hook to grip onto an opening on the lower side of the casing. The locking operation is therefore automatic. In addition, the stopping bar at the rear of the main body is employed and confined to the corner against the windshield in front of the dashboard, thereby preventing the steering wheel from being turned and achieving optimum anti-theft effects.

1 Claim, 7 Drawing Sheets

CONFIGURATION OF AUTOMOBILE STEERING WHEEL LOCKING DEVICES

DESCRIPTION OF THE INVENTION

The present invention concerns an improvement in the configuration of automobile steering wheel locking devices, and, more particularly, a locking device that wraps around the upper part of a steering wheel, can be locked automatically and is confined to the corner against the windshield in front of the dashboard.

As shown in FIG. 1, conventional automobile steering wheel locking devices principally consist of a main body 10, with the inside of one end thereof being equipped with a steel bail 11, spring 12 and stopping plate 13, the lower side of said main body 10 being equipped with a hook 15 and the inside of said main body being equipped with an extension bar 16. Additionally, the front of said extension bar 16 is equipped with a hook 160, and the surface of said extension bar 16 possesses several ring-shaped grooves 161. Moreover, said main body 10 functions as a stopping arm. As shown in FIG. 2, a steering wheel locking device with said configuration can be locked onto the steering wheel by means of the hooks, which involves placing said steering wheel locking device on top of the steering wheel, placing the hook 15 on the lower part of said main body 10 onto the steering wheel, opening the lock with a key, extending said extension bar 16 so that the hook 160 thereof is secured against the opposite inner side of the steering wheel, and turning the key to the original position to complete the locking operation. The surface of said extension bar 16 is equipped with several ring-shaped grooves 161 for preventing said extension bar 16 from sliding into the main body 10 and ensuring that the hook 160 on said extension bar 16 grips onto the steering wheel securely. Furthermore, the stopping arm of the main body 10 limits the degree that the steering wheel can be turned.

However, the aforesaid automobile steering wheel locking device employed currently is subject to the following drawbacks:

1. In order to lock onto the two inner sides of the steering wheel, said main body 10 and extension bar 16 must possess hooks 15 and 160 respectively, requiring welding, and the surface of said extension bar 16 must be machined to form the ring-shaped grooves 161, thereby increasing the manufacturing cost.
2. The steering wheel can still be turned, because the operation principal involves the extension of said main body 10 being held by the windshield or the driver's leg.
3. The locking operation is cumbersome and not automatic, because both the locking and unlocking steps require the use of a key to turn the lock.

In light of the fact that conventional automobile steering wheel locking devices are subject to the aforementioned drawbacks, the inventor of the present invention arrived at the present invention after conducting diligent research aimed at improving said locking devices.

The principal objective of the present invention is to present an automobile steering wheel locking device that grips onto the steering wheel securely, can be locked automatically and is confined to the corner against the windshield in front of the dashboard for completely preventing the steering wheel from being turned.

The present invention is characterized principally by the fact that the front upper part of the main body is equipped with a cavity, with the rear wall thereof being equipped with a raised rod and the lower side thereof being equipped with an opening, that the bottom of said main body possesses an opening, with the front thereof possessing a notch and the two sides of said notch each possessing a through hole, that the locking device pertaining to the present invention includes a lock, which is to be placed inside said cavity and possesses a cross bar protruding from the rear of said lock's turning piece, that said locking device is equipped with a casing, which possesses a groove at the front thereof that binds to the protruding cross bar at the rear of said lock's turning piece, that the rear of said casing possesses a raised rod, the lower side is equipped with an opening and one side of said opening possesses a beveled surface, that said locking device is equipped with a spring, which is placed between said casing and the raised rod at the rear wall of said main body's cavity, that said locking device possesses a hook hinged onto the lower side of said main body's opening, that said hook is curved, the tip thereof is round, the inner side thereof is equipped with a grip slot, the top of said grip slot is flat while the bottom thereof is beveled, and the bottom of said hook is equipped with a through hole, and that said locking device also includes a holding shaft, which is to be inserted into the two through holes on the two sides of said notch and the through hole of said hook.

A preferred practical example including figures is described below for explaining the technical means employed for achieving the aforesaid merits and objectives pertaining to the present invention.

As shown in FIG. 3, the automobile steering wheel locking device pertaining to the present invention includes a main body 2 in the shape of a dragon head, with the front upper part thereof being equipped with a cavity 20. The rear wall of said cavity 20 is equipped with a raised rod 201, and the lower side of said cavity 20 is equipped with an opening 202. Additionally, the bottom of said main body 2 possesses an opening 21, with the front thereof possessing a notch 22 and the two sides of said notch 22 possessing through holes 220 and 221. A stopping bar 23 is welded onto the rear of said main body 2. Said locking device pertaining to the present invention includes a lock 3, which is to be placed inside said cavity 20. The front of the turning piece 30 of said lock 3 has a key hole 300 in the shape of a cross, and the rear of said turning piece 30 possesses a protruding cross bar 301. Said locking device also includes a casing 4, which possesses a groove 40 at the front thereof that binds to the protruding cross bar 301 at the rear of said lock 3's turning piece 30. Additionally, the rear of said casing has a raised rod 41, and the lower side is equipped with an opening 42, with one side of said opening 42 possessing a beveled surface 43. Said locking device also includes a spring 5, which is placed between the raised rod 41 of said casing 4 and the raised rod 201 at the rear wall of said cavity 20, and a hook 6 hinged onto the lower side of said main body 2's notch 22. Said hook 6 is curved, the tip 60 thereof is round, the inner side thereof is equipped with a grip slot 61, the top of said grip slot 61 is a flat surface 610 while the bottom thereof is a beveled surface 611, and the bottom of said hook 6 is equipped with a through hole 62. A holding shaft 7 is inserted into the two through holes 220 and 221 on the two sides of said notch 22 and the through hole 62 of said hook 6.

Said locking device pertaining to the present invention is assembled in the following manner. The spring 5 is inserted onto the raised rod 201 at the rear wall of said cavity 20. Next, the raised rod 41 at the rear of said casing 4 is inserted into the other end of said spring 5, followed by placing the protruding cross bar 301 at the rear of the turning piece 30 of said lock 3 into the groove 40 at the front of said casing 4. Finally, the holding shaft 7 is inserted into the through hole 62 to secure the hook 6 into the notch 22 of said main body 2, as shown in FIG. 4.

As shown in FIGS. 5 and 7, the locking operation (i.e., when placing said locking device onto the steering wheel A) involves the following steps. The opening 21 at the front of the main body 2 in the shape of a dragon head is placed onto the steering wheel A, followed by pushing the hook 6 upward. Meanwhile, the force exerted by the spring 5 causes the groove 40 at the front of said casing 4 to press against the protruding cross bar 301 at the rear of the turning piece 30 of said lock 3. As a result, the round tip 60 of the hook 6 comes into contact with the beveled surface 43 at the opening 42 on the lower side of said casing 4 in such a manner that allows the hook 6 to be pushed upward until the grip slot 61 thereof grips onto the opening 42 on the lower side of said casing 4. More specifically, the flat surface 610 of the grip slot 61 at the inner side of said hook 6 catches onto the opening 42, preventing the hook 6 from being pulled out. Additionally, the entire beveled surface 43 of the opening 42 comes into contact with the beveled surface 611 of the grip slot 61, allowing the catch to be even more secure. Thus, said locking device can be locked on quickly around the steering wheel A, and the steering wheel A is prevented from being turned by means of the stopping bar 23, which is confined to the corner against the windshield in front of the dashboard, thereby achieving the objective of preventing thieves from turning the steering wheel.

As shown in FIG. 6, the unlocking operation in which said hook 6 is to be released (i.e., when removing said locking device from the steering wheel) simply involves turning the lock 3 approximately 90° with a key, which causes the protruding cross bar 301 at the rear of the turning piece 30 of said lock 3 to be at a right angle with the groove 40 at the front of said casing 4. As a result, the casing 4 is pushed backward and the spring is at a compression state, thereby allowing a space to form between the opening 42 at the lower side of said casing 4 and the grip slot 61 at the inner side of the hook 6. Accordingly, the weight of the hook 6 causes it to fall down, allowing said automobile steering wheel locking device to the removed quickly.

As clearly shown in the aforesaid practical example, the automobile steering wheel locking device pertaining to the present invention is more practical than conventional automobile steering wheel locking device, and exhibits the following merits:

1. Said locking device pertaining to the present invention grips tightly onto the steering wheel and prevents it from being turned.
2. Said hook 6 can be removed and inserted quickly and reliably, allowing the locking and unlocking operations to be performed accurately.
3. Simple components are employed and the assembly procedure is not complicated. In addition, said locking device pertaining to the present invention can be locked automatically without requiring a key.

Figure 1:
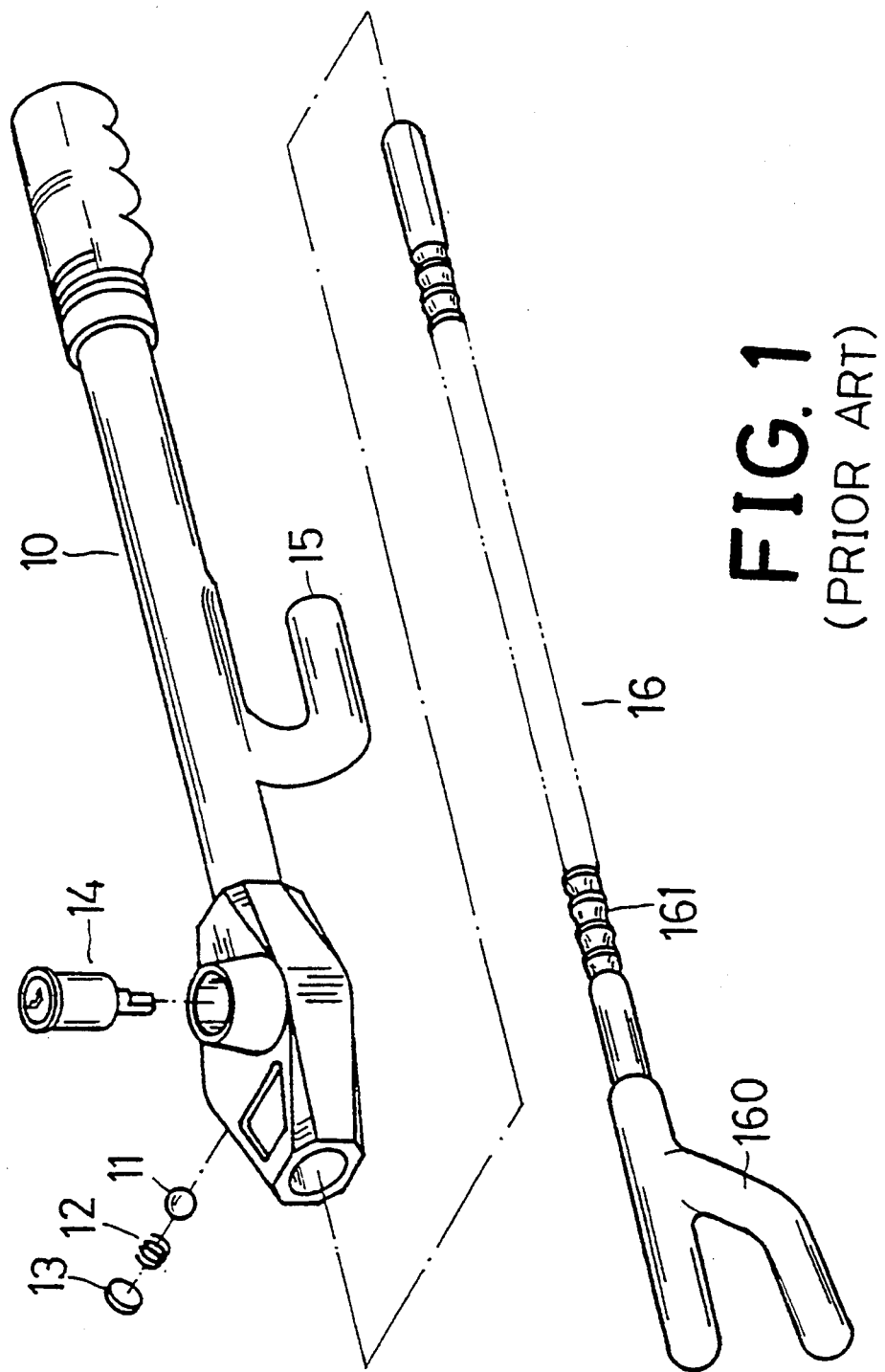
FIG. 1: An exploded perspective drawing showing a conventional automobile steering wheel locking device.
Figure 2:
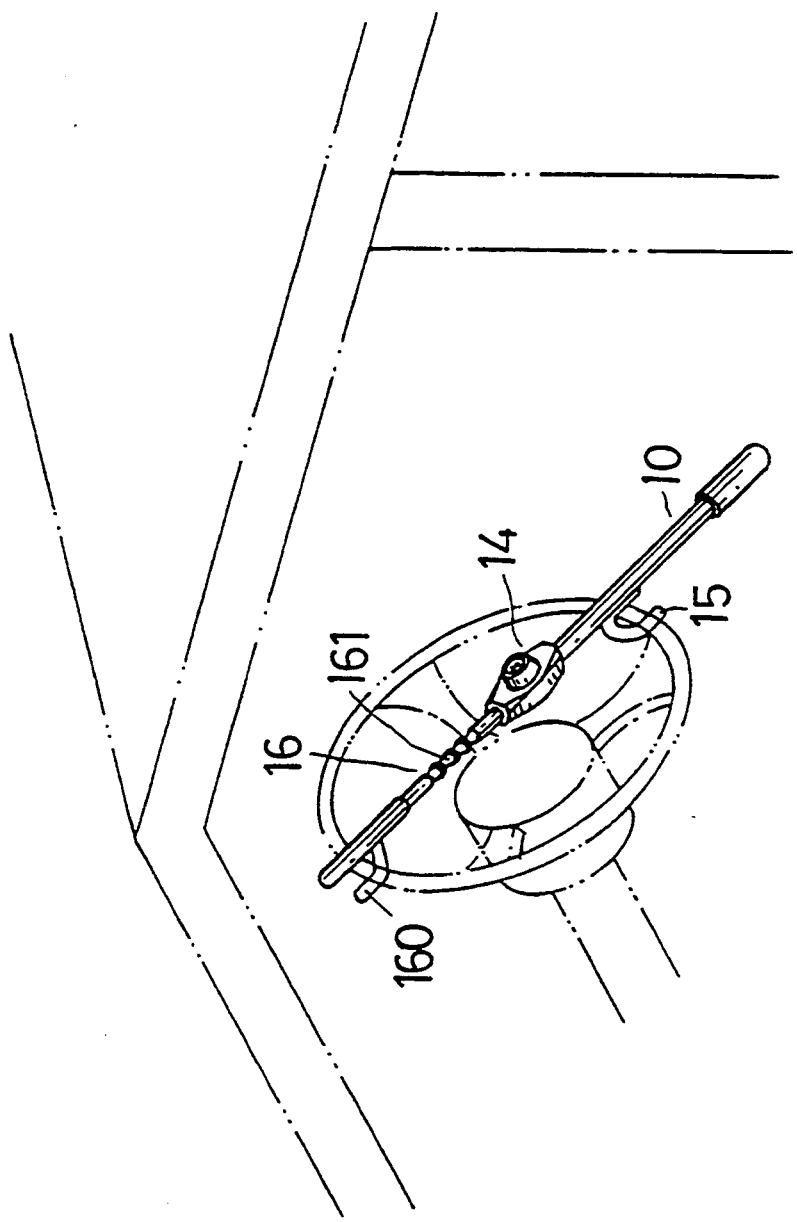
FIG. 2: A drawing showing the employment of a conventional automobile steering wheel locking device.
Figure 3:
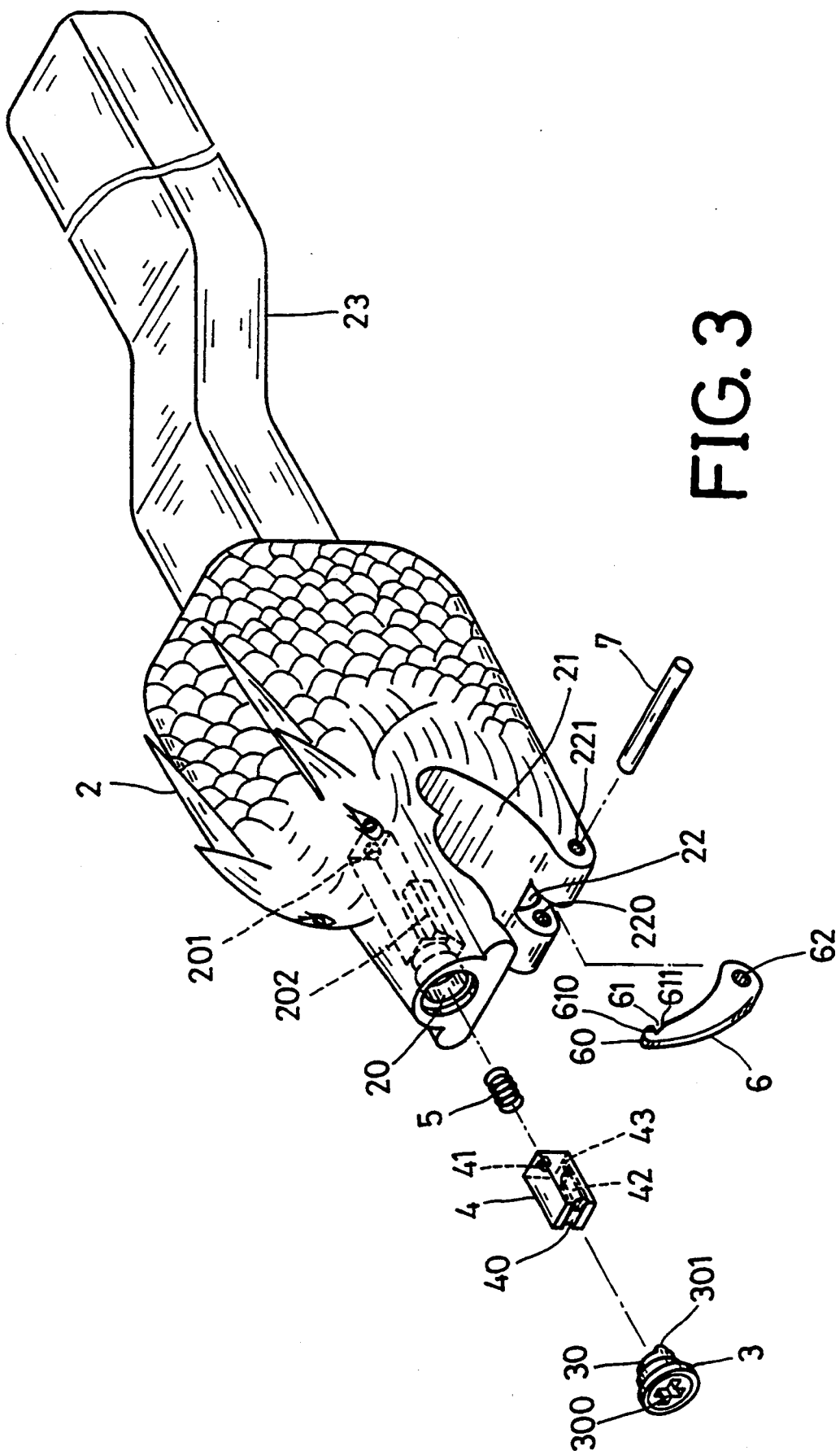
FIG. 3: An exploded perspective drawing showing a practical example pertaining to the present invention.
Figure 4:
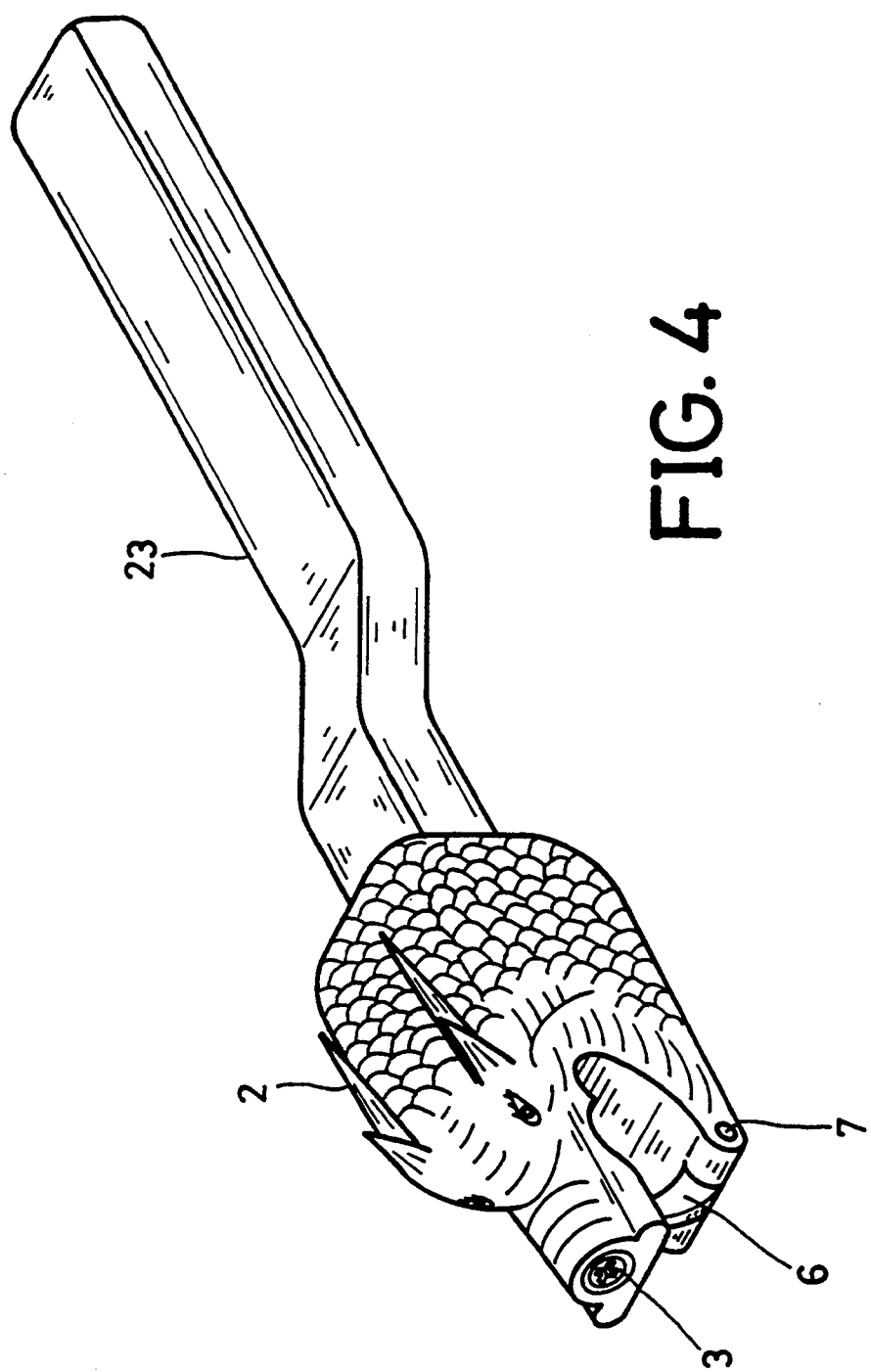
FIG. 4: A perspective view of the components pertaining to the practical example of the present invention.
Figure 5:
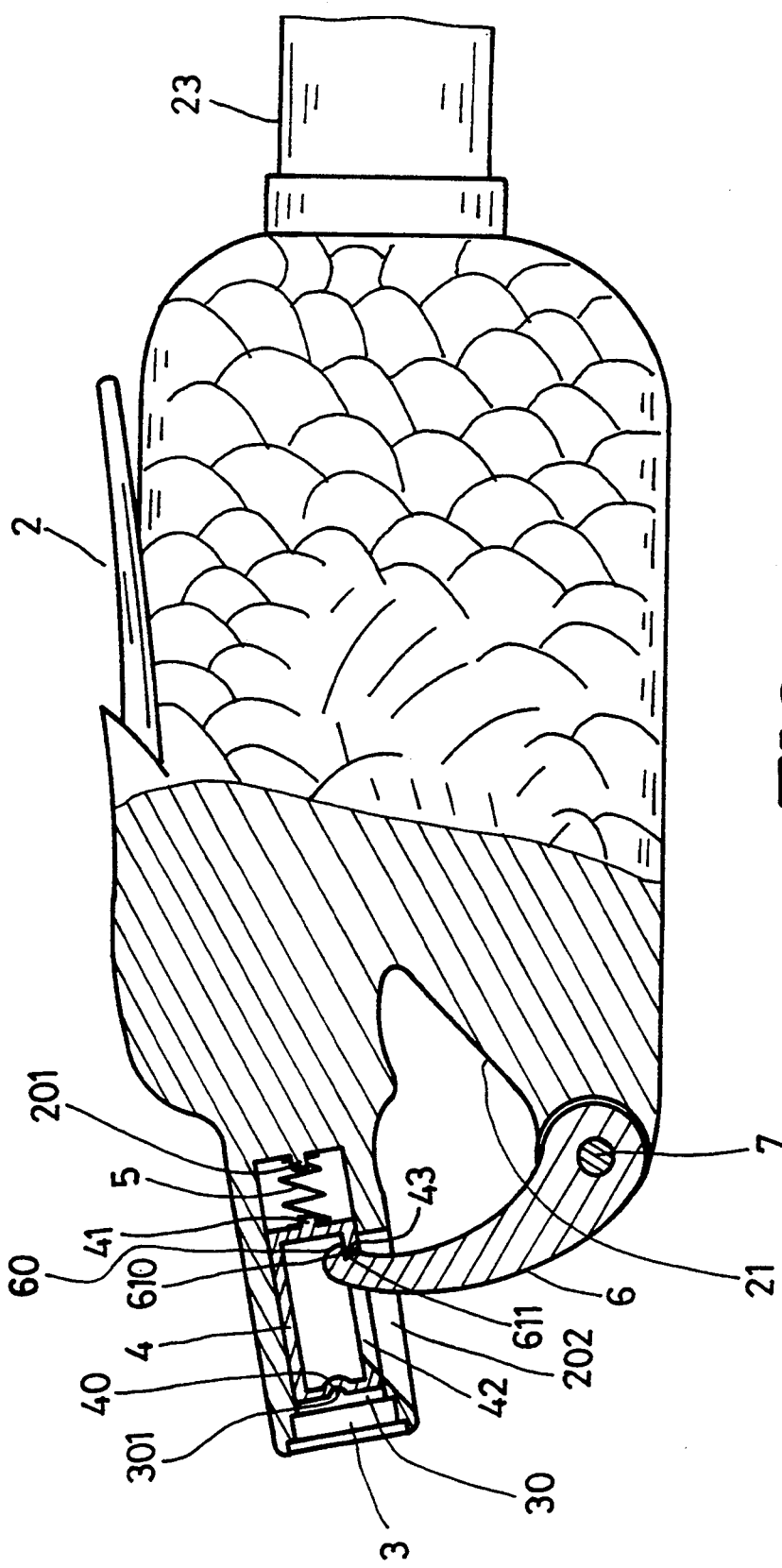
FIG. 5: A dissection drawing showing the locking state pertaining to the practical example of the present invention.
Figure 6:
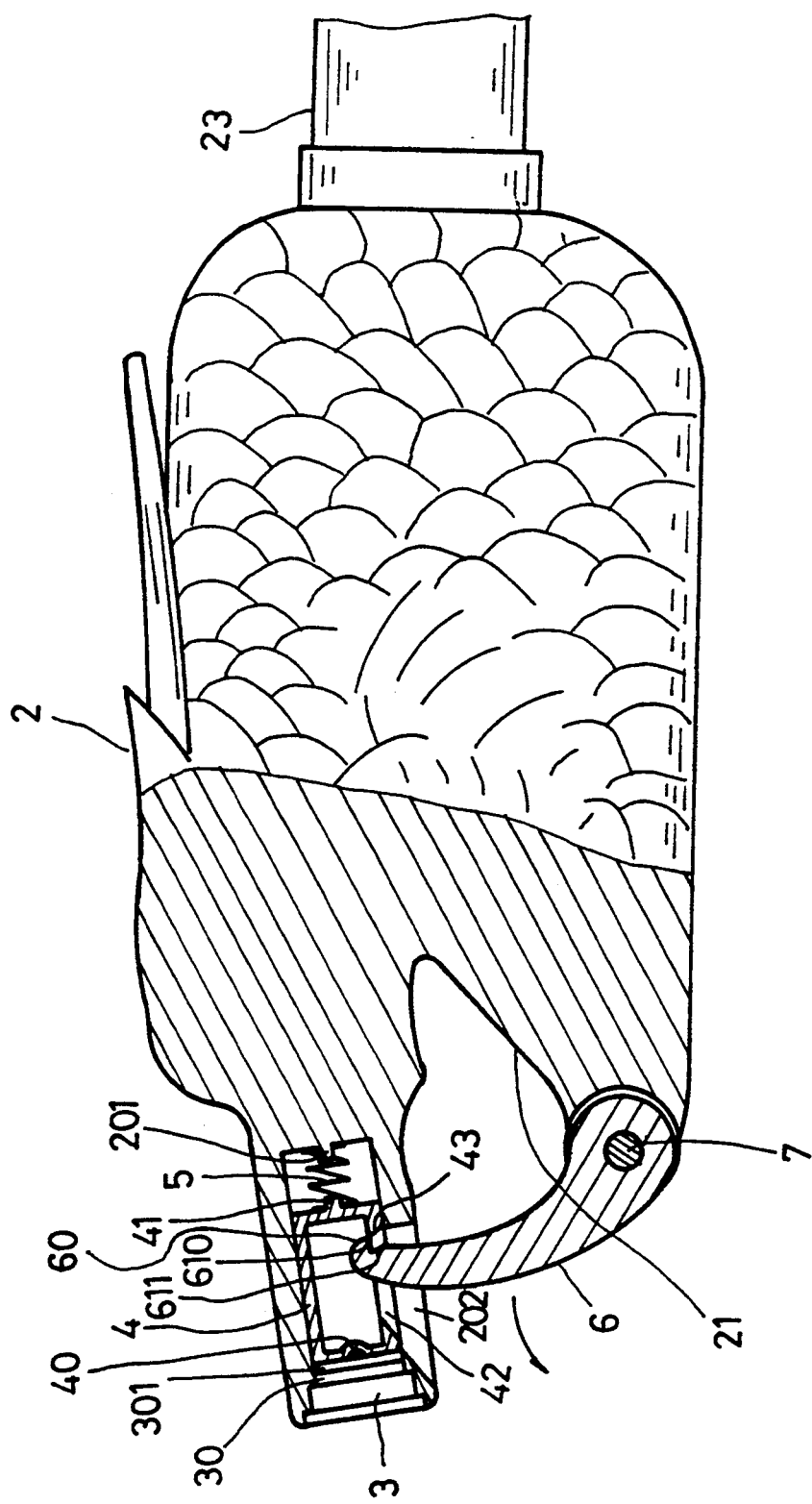
FIG. 6: A dissection drawing showing the un-locking state pertaining to the practical example of the present invention.
Figure 7:
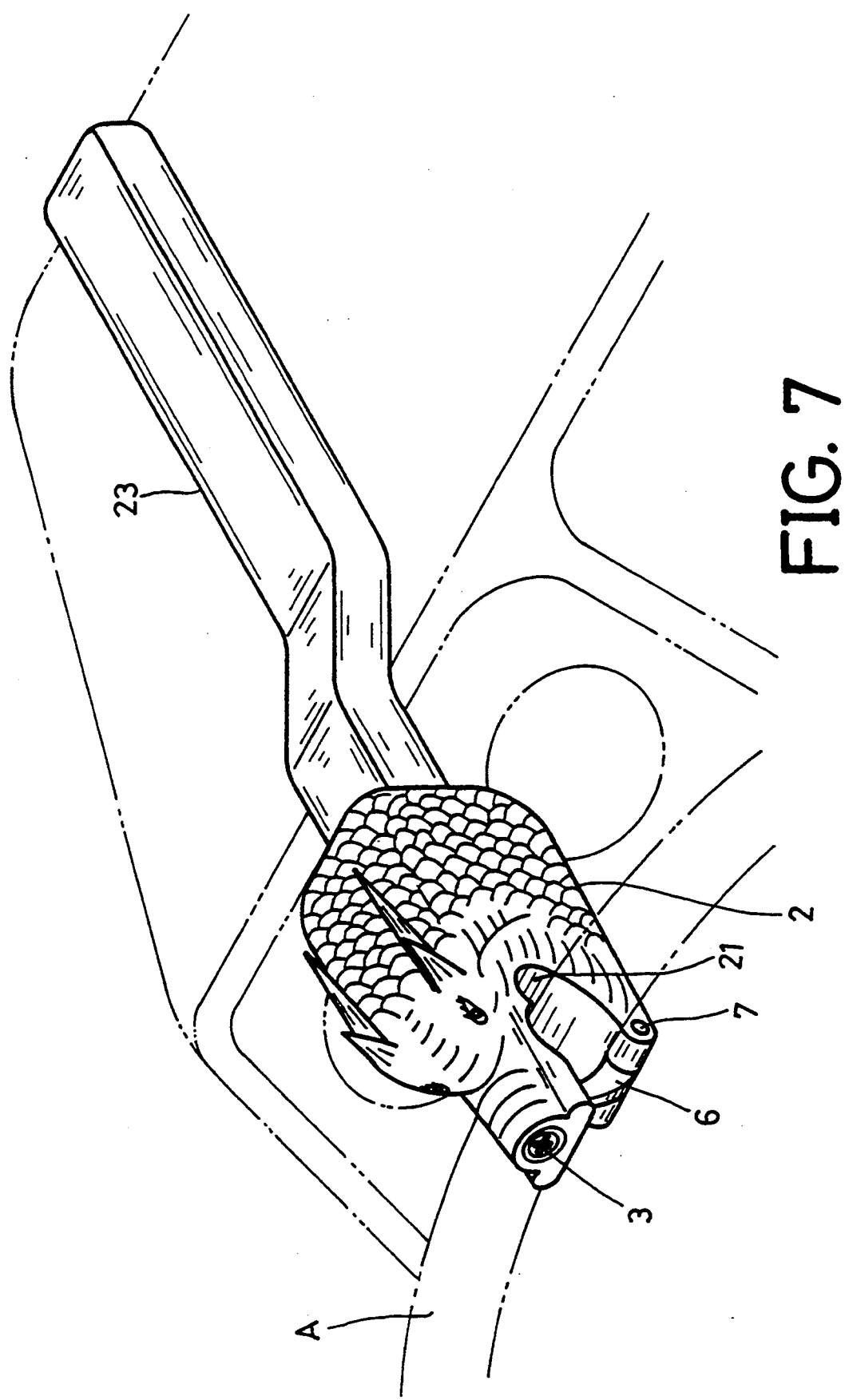
FIG. 7: A drawing showing the employment of the automobile steering wheel locking device pertaining to the practical example of the present invention.

I claim:

1. A locking device for an automobile steering wheel comprising:
    (1) a main body equipped with a cavity at an upper front part thereof, a raised rod located at a rear wall of said cavity, an opening located at a lower side of said cavity, an opening at a front lower side of said main body, a notch at a front of said opening on the lower side of the main body, a through hole on each side of said notch, and a stopping bar welded at a rear of said main body,
    (2) a lock placed inside said cavity equipped with a protruding cross bar at an end of a turning piece of the lock,
    (3) a casing that binds to a rear of said turning piece, a raised rod at a rear end of the casing, an opening at a bottom of the casing, and a beveled surface on one side of said opening at the bottom of the casing,
    (4) a spring secured to the raised rod at the end of said casing and the raised rod at the rear wall of the main body's cavity,
    (5) a hook pivotally secured in the notch in the main body, wherein the tip of said hook is round, an inner side of the tip is equipped with a grip slot, an upper side thereof is a flat surface, the lower side thereof is a beveled surface, and a bottom of said hook is equipped with a through hole, and
    (6) a holding shaft that holds said hook in the notch at the front of said main body, said locking device being characterized by the facts that:
    (a) turning of the lock's turning piece with a key causes the cross bar at the end of said turning piece to push back said casing and compress the spring, thereby quickly releasing the hook and allowing said locking device to be removed from the steering wheel,
    (b) said locking device can be quickly locked around the steering wheel by pushing the hook upward, thereby causing the grip slot on the inner side of said hook to grip onto the opening on the bottom of said casing, and allowing the locking operation to be automatic, with no requirement that a key be used, and
    (c) the stopping bar at the rear of the main body is employed and confined to a corner defined by a windshield and a front edge of a dashboard, thereby preventing the steering wheel from being turned and achieving optimum anti-theft effects.

* * * * *